United States Patent [19]

Northey et al.

[11] Patent Number: 5,286,412
[45] Date of Patent: Feb. 15, 1994

[54] MODIFIED LIGNOSULFONATE DISPERSANT FOR GYPSUM

[75] Inventors: Robert A. Northey, Bellevue; Sara-Kaye Madsen, Tacoma, both of Wash.

[73] Assignee: Georgia-Pacific Corporation, Atlanta, Ga.

[21] Appl. No.: 777,073

[22] Filed: Oct. 16, 1991

[51] Int. Cl.$^5$ .............................................. C04B 24/18
[52] U.S. Cl. ................................... 252/352; 252/353; 106/780
[58] Field of Search ................. 106/780; 252/352, 353

[56] References Cited

U.S. PATENT DOCUMENTS

| | | |
|---|---|---|
| 2,856,304 | 10/1958 | Kirk . |
| 2,935,504 | 5/1960 | King et al. . |
| 3,007,910 | 11/1961 | Adolphson et al. . |
| 3,070,591 | 12/1962 | Hoyt . |
| 3,108,008 | 10/1963 | King et al. . |
| 3,244,623 | 4/1966 | King et al. . |
| 3,278,425 | 10/1966 | King et al. . |
| 3,405,061 | 10/1968 | Keirstead et al. ................... 252/353 |
| 3,668,123 | 6/1972 | Steinberg et al. . |
| 4,059,456 | 11/1977 | DeRooy et al. . |
| 4,100,155 | 7/1978 | Ashorn et al. . |
| 4,169,747 | 10/1979 | DeRooy et al. . |
| 4,728,727 | 3/1988 | Reintjes et al. . |

FOREIGN PATENT DOCUMENTS

| | | |
|---|---|---|
| 2246153 | 3/1974 | Fed. Rep. of Germany . |
| 1321648 | 2/1963 | France . |
| 7412755 | 10/1973 | Netherlands . |

*Primary Examiner*—David Brunsman
*Attorney, Agent, or Firm*—Banner, Birch, McKie and Beckett

[57] ABSTRACT

The present invention relates to a non-set retarding lignosulfonate dispersing agent useful for making an aqueous calcined gypsum slurry, said dispersing agent produced by contacting an aqueous solution of a lignosulfonate with a salt of a multivalent metal selected from the group consisting of iron (II), iron (III), manganese (II) and cobalt (II) to form an aqueous solution of a multivalent metal salt and lignosulfonate having an acidic pH, and thereafter neutralizing said aqueous solution of said multivalent metal salt and lignosulfonate at an elevated temperature with an alkaline material.

17 Claims, No Drawings

MODIFIED LIGNOSULFONATE DISPERSANT FOR GYPSUM

BACKGROUND OF THE INVENTION

1. Field of the Invention

The present invention pertains to a modified lignosulfonate composition; its method of preparation and its use as a dispersant, particularly in the manufacture of gypsum wallboard.

2. Description of Related Art

The use of lignosulfonate as a dispersing agent in the preparation of gypsum wallboard is disclosed, for example, in U.S. Pat. No. 2,856,304. In the manufacture of gypsum products such as wallboard, lath, plaster board, sheathing or other products, calcined gypsum is formed into a slurry with a suitable amount of water and, where customary, with other additives such as paper fiber, wood fiber, starch, rosin, etc.

In the preparation of wallboard or similar products, in particular, the slurry then is deposited between paper liners, pressed to the desired thickness by forming rolls, allowed to set and harden, cut to desired lengths, and passed through a dryer to remove excess moisture. A portion of the water used in making the slurry combines with the calcined gypsum, as water of crystallization, in forming the final set mass of interlaced crystals, but a large portion of the water must be removed in the dryer. Obviously, the drying process is more costly as the proportion of water to be removed from the formed board is higher.

It is known that using lignosulfonate as a dispersing agent reduces the amount of water required to provide a flowable gypsum slurry during the deposition and forming steps. Consequently, by using lignosulfonate, the amount of water to be removed during the final drying step can be reduced, resulting in a significant economy of operation, particularly as regards lower energy costs. An ancillary benefit also often observed is higher board strength. It also is known that lignosulfonate exhibiting improved dispersing ability is prepared by base exchange of the lignosulfonate with various metals, including iron, aluminum, chromium and copper, by alkaline treatment, by oxidation and the like. See, for example U.S. Pat. Nos. 2,935,504; 3,007,910; and 3,108,008.

Unfortunately, lignosulfonates also tend to retard the hardening or cure rate of the gypsum board, referred in the art as set retardation. While this does not present a problem with slower forming operations characteristic of the prior art, with the advent of faster processes, set retardation has matured into a significant concern. In fact, while hydrolysis and oxidation reactions tend to enhance the dispersing behavior of the lignosulfonate, such treatments tend to exacerbate set retarding characteristics.

In the prior art, the problem of set retardation has been dealt with primarily by adding various accelerating agents to the aqueous lignosulfonate-gypsum slurry. The prior art indicates that materials such as sodium chloride, aluminum sulfate, potassium sulfate, calcium sulfate dihydrate, and uncalcined or raw gypsum help to ameliorate set retardation.

Finally, in U.S. Pat. No. 2,856,304 it is taught that calcining raw gypsum containing a small amount of lignosulfonate helps reduce the setting time of the calcined gypsum product.

In accordance with the present invention, lignosulfonate is treated in a way which enhances its capability to disperse gypsum, while at the same time, avoids imparting to the lignosulfonate an undesirable increase in its set retardation characteristics. By using the modified lignosulfonate composition of the present invention, the amount of water needed to form a calcined gypsum slurry having the necessary plasticity is considerably reduced, and the production of gypsum shapes is simultaneously accelerated.

DESCRIPTION OF THE INVENTION

The present invention is broadly directed to a lignosulfonate composition which when used in preparing a calcined gypsum slurry exhibits an improved dispersing property and a lowered set-retarding characteristic. The composition is prepared by base exchange of a low pH lignosulfonate with a metal salt followed by alkaline neutralization at an elevated temperature, typically above 50° C. The process preferably is conducted in a way that avoids excessive oxidation of the lignosulfonate.

In one specific aspect, the present invention pertains to a non-set retarding lignosulfonate dispersing agent composition useful for making an aqueous calcined gypsum slurry which composition is produced by reacting an aqueous solution of a lignosulfonate with a salt of a multivalent metal selected from the group consisting of iron (II), iron (III), manganese (II) and cobalt (II) to form an aqueous solution of said multivalent metal salt and lignosulfonate having an acidic pH, and thereafter neutralizing said aqueous solution of said multivalent metal salt and lignosulfonate at an elevated temperature with an alkaline material.

In another aspect, the present invention relates to a method for producing a non-set retarding lignosulfonate dispersing agent composition useful for making an aqueous calcined gypsum slurry comprising reacting an aqueous solution of a lignosulfonate with a salt of multivalent metal selected from the group consisting of iron (II), iron (III), manganese (II) and cobalt (II) to form an aqueous solution of said multivalent metal salt and lignosulfonate having an acidic pH, and thereafter neutralizing said aqueous solution of said multivalent metal salt and lignosulfonate salt at an elevated temperature with an alkaline material.

In still another aspect, the present invention relates to the method for preparing a plastic slurry of calcined gypsum and water wherein a water soluble lignosulfonate is added to said slurry to reduce the water requirement for forming said plastic slurry, the improvement comprising using as at least a portion of said lignosulfonate, a non-set retarding lignosulfonate dispersing agent composition produced by reacting an aqueous solution of a lignosulfonate with a salt of a multivalent metal selected from the group consisting of iron (II), iron (III) manganese (II) and cobalt (II), to form an aqueous solution of said multivalent metal salt and lignosulfonate having an acidic pH, and thereafter neutralizing said aqueous solution of said multivalent metal salt and lignosulfonate at an elevated temperature with an alkaline material.

The lignosulfonate used in the present invention can be sulfite lignin material recovered directly from the pulping of cellulosic materials using the sulfite process or the sulfonated lignin material produced by sulfonating the Kraft lignin recovered as a by-product when pulping cellulosic materials using the Kraft process. As used herein, the term Kraft lignin has its normal connotation, and refers to the lignin containing material typically recovered from alkaline pulping black liquors, such as are produced in the Kraft, soda and other well known alkaline pulping operations. Sulfonated lignin is obtained by the introduction of sulfonic acid groups into the Kraft lignin molecule, as may be accomplished by reaction of Kraft lignin with sulfite or bisulfite compounds, so that the Kraft lignin is rendered water soluble. Sulfite lignin is the water soluble reaction product of lignin inherently obtained during the sulfite pulping of wood, and is the principle constituent of spent sulfite liquor (SSL).

In the present application, the term "lignosulfonate" therefore encompasses not only the sulfite lignin, but also sulfonated lignin. The lignin source for obtaining the lignosulfonate may be any common cellulosic material including hardwoods and softwoods and may be either crude or pure. Lignin recovered from the preparation of paper grade quality pulp in suitable. Typically, the lignosulfonate appears as one of its alkali metal or alkaline earth metal salts such as sodium, potassium, calcium, magnesium or ammonium lignosulfonate.

In accordance with the present invention, an aqueous solution of a particular lignosulfonate salt first is prepared from a suitable source of lignosulfonate. One particularly convenient and preferred lignosulfonate source because of its cheapness and large supply is the spent sulfite liquor (SSL), directly recovered from the sulfite pulping of cellulosic materials, such as wood. In such material, in addition to the sulfonated lignin material, the lignosulfonate solution also will contain other materials, such as complex carbohydrates (wood sugars) and the like, common to such sulfite pulping by-products. Preferably, the SSL is treated, such as by fermentation using known procedures, to reduce or remove such additional ingredients. It also is often desirable to increase the solids content of the SSL by concentration pretreatment before using it in the process of the present invention. An aqueous lignosulfonate solution also can be prepared from by-product lignosulfonate solids by dissolving in water an appropriate amount of such solids. Lignosulfonate materials are available commercially and are obtained in various fashions from the various sources of lignin described above. Suitable commercial lignosulfonate products include LIGNOSITE ® 100 and LIGNOSITE ® CX, available from Georgia-Pacific Corporation.

While the solids content of the lignosulfonate solution used to prepare the modified lignosulfonate of the present invention is not critical, it is preferred, based principally on processing considerations, that the solids content of the solution be between about 30 and 60 weight percent and more preferably between about 40 and 50 weight percent.

In accordance with the present invention, it is important to avoid oxidizing, either by air or other chemical oxidants, the lignosulfonate material used to prepare the modified lignosulfonate composition of the present invention. In other words, the lignosulfonate used in the present invention should be a substantially non-oxidized form of lignosulfonate. While oxidation does improve the dispersing ability of the lignosulfonate, it generates an excessive amount of set-retarding species.

As a general rule, solutions of lignosulfonates suitable for use in the present invention inherently exhibit a pH below about 7.0 and usually between about 4 and 6 in aqueous solution. However, if for some reason the pH of the lignosulfonate is at or above a pH of about 7.0, as will be the case if an alkaline treated lignosulfonate material is used, it may be necessary and generally will be preferred that sufficient acid be added to the solution to reduce the pH to below 7.0 and preferably to at least about 4. The acid can be added either before or after the subsequent addition of the metal salt. Any acid can be used for this purpose, although for convenience a readily available and inexpensive mineral acid should be used, preferably sulfuric acid.

The lignosulfonate solution then is treated or contacted (reacted) with a preferably water soluble salt of a multivalent metal selected from the group consisting of iron (II), iron (III), cobalt (II) and manganese (II). Preferred multivalent metal salts include ferric sulfate, ferrous sulfate, manganese sulfate and cobalt sulfate, although other non-oxidizing salts of these metals also could be used. The iron salts are preferred. Generally, the metal salt is added to the lignosulfonate solution in an amount between about 1.0 and 10.0 weight percent metal cation based on the mass of lignosulfonate solids in the solution, and preferably between about 3.0 and 5.0 weight percent.

It is an important feature of the present invention that the pH of the metal salt-treated lignosulfonate solution have an acid pH. A pH below about 6.5 has proven to be suitable. Preferably, the pH is below about 5.0, and most preferably about 4.0 or below. Normally, the lower the solids concentration of the lignosulfonate solution that is being treated, the lower is the desired pH during the base exchange treatment with the multivalent metal salt.

The lignosulfonate solution and metal salt thereafter are contacted (reacted) for a time sufficient to form the multivalent metal salt of the lignosulfonate and reduce the set retarding character of the lignosulfonate solution. Although not wishing to be bound to any theoretical explanation, it is believed that the metal salts react or interact with set retarding compounds in the lignosulfonate solution, possibly sugar acids, to form chelated species that exhibit lower set retarding tendencies than their precursors.

Generally a reasonable contacting time or reaction time between the lignosulfonate solution and metal salt of about 5 to 30 minutes is sufficient to obtain the desired level of treatment. Shorter times tends to be less successful in producing the desired result of lower set retardation, while longer times do not seem to provide any added improvement and thus are unnecessary. The temperature of the lignosulfonate solution during this treatment is not critical, although higher temperatures permit the desired level of treatment to be achieved in shorter times. Moreover, since the subsequent treatment of the lignosulfonate solution in accordance with the present invention is conducted at an elevated temperature, it is convenient to perform this initial step at the same temperature. However, use of an elevated pressure and temperatures, for example, at or above 100° C., both during this step and in the subsequent step tend to be unnecessary and uneconomical due to higher energy demands.

Once the reaction between the lignosulfonate solution and the multivalent metal salt has proceeded to a desired extent, the temperature of the solution is raised, as may be needed, to above about 50° C. Preferably the temperature of the lignosulfonate solution is adjusted to between about 80° and 95° C., and usually to about 90° C.

At this point, the acidic lignosulfonate solution is neutralized with an at least partially water soluble alkaline material to a pH of about 7.0, preferably below about 8.0 and generally between about 6.8 and 7.2. A composition having acceptable set retarding and dispersion enhancing properties are not obtained unless the acidic metal salt-treated lignosulfonate solution is substantially neutralized. Increasing the pH beyond neutrality and into the alkaline regime, however, is not necessary and tends to be disadvantageous because it consumes more alkaline material than needed to obtain the benefits of the present invention. The neutralized solution then is kept at the elevated temperature for a time sufficient to stabilize the lowered set retarding and dispersing enhancing character of the lignosulfonate. A retention time of about 10 to 45 minutes generally should be sufficient. The dispersing enhancing and lower set retarding modified lignosulfonate composition then is recovered, as an aqueous solution, and any solid impurities can be removed, for example, by centrifugation.

Based on cost considerations a common inorganic base or alkaline reagent such as an alkali metal or alkaline earth metal hydroxide is used as the at least partially water soluble alkaline material, although any of a wide variety of other at least partially water soluble alkaline materials can be used. Suitable results have been obtained using sodium, potassium, ammonium, calcium or magnesium hydroxide. Because of the prevalence of calcium in the gypsum slurry, an alkaline calcium compound, such as calcium hydroxide, often is preferred. The amount of alkaline material to be added depends on the alkaline material actually used, the original pH level of the acidic lignosulfonate material and the desired final pH.

Again, not wishing to be bound to any particular theory, it is thought that neutralization of the multivalent metal salt-treated lignosulfonate solution at the elevated temperature stabilizes the less set-retarding chelate species formed during the initial phase of treatment, without significantly affecting the dispersing enhancing ability of the lignosulfonate.

The so-recovered, modified lignosulfonate composition of the present invention is suitable for preparing a slurry of calcined gypsum used to prepare gypsum wallboard. The lignosulfonate is suitably added in the form of an aqueous solution to the calcined gypsum. The modified lignosulfonate can be the aqueous solution produced directly from the process of the present invention or can be a subsequently isolated portion of the solids fraction of the solution. Preferably, the lignosulfonate is dissolved in water which then is used to prepare the gypsum slurry itself. Alternatively, lignosulfonate in dry form can be blended with the calcined gypsum, either wet or dry.

Various aspects of the present invention now will be described and illustrated below in greater detail with reference to specific examples, in which the parts and percentages are by weight unless otherwise indicated.

EXAMPLES

EXAMPLE 1

An amount of 43.2 grams of solid ferrous sulfate heptahydrate was added to 503.9 grams of an aqueous solution containing 49.2 wt % unneutralized fermented calcium lignosulfonate maintained at a temperature of 90° C. The calcium lignosulfonate and ferrous sulfate heptahydrate reacted (were mixed) for 12 minutes. After adding the metal salt, the solution had a pH of 3.8. The aqueous material then was neutralized to a pH of 7.0 with a calcium hydroxide slurry and stirred for 19 minutes. Thereafter, the reaction mixture at 90° C. was centrifuged for ten minutes at 5000 rpm to remove insoluble impurities and recover an aqueous solution of a modified lignosulfonate composition.

EXAMPLE 2

An amount of 30.3 grams of solid cobalt sulfate heptahydrate was added to 368.9 grams of an aqueous solution containing 49.2 wt % unneutralized fermented calcium lignosulfonate maintained at a temperature of 90° C. The calcium lignosulfonate and cobalt sulfate heptahydrate reacted (were mixed) for 11 minutes. After adding the metal salt, the solution had a pH of 3.5. The aqueous material then was neutralized to a pH of 7.0 with a calcium hydroxide slurry and stirred for 23 minutes. Thereafter, the reaction mixture at 90° C. was centrifuged for ten minutes at 5000 rpm to remove insoluble impurities and recover an aqueous solution of a modified lignosulfonate composition.

EXAMPLE 3

An amount of 20.9 grams of solid cupric sulfate pentahydrate was added to 308.2 grams an aqueous solution containing 49.2 wt. % unneutralized fermented calcium lignosulfonate maintained at a temperature of 90° C. The calcium lignosulfonate and cupric sulfate pentahydrate reacted (were mixed) for 13 minutes. After adding the metal salt, the solution had a pH of 2.45. The aqueous material then was neutralized to a pH of seven with a calcium hydroxide slurry and stirred for 21 minutes. Thereafter, the reaction mixture at 90° C. was centrifuged for ten minutes at 5000 rpm to remove insoluble impurities and recover an aqueous solution of a modified lignosulfonate composition.

EXAMPLE 4

An amount of 22.8 grams of zinc sulfate heptahydrate was added to 294.1 grams of an aqueous solution containing 49.2 wt. % unneutralized fermented calcium lignosulfonate maintained at a temperature of 90° C. The calcium lignosulfonate and zinc sulfate heptahydrate reacted (were mixed) for ten minutes. After adding the metal salt, the solution had a pH of 3.5. The material then was neutralized to a pH of seven with a calcium hydroxide slurry and mixed for 21 minutes. The reaction mixture at 90° C. was centrifuged for ten minutes at 5000 rpm to remove insoluble impurities and recover an aqueous solution of a modified lignosulfonate composition.

EXAMPLE 5

An amount of 24.9 grams of ferric sulfate heptahydrate was added to 342.3 grams of an aqueous solution containing 49.2 wt. % unneutralized fermented calcium lignosulfonate maintained at a temperature of 90° C. The calcium lignosulfonate and ferric sulfate heptahydrate reacted (were mixed) for 15 minutes. After adding the metal salt, the solution had a pH of 1.7. The material then was neutralized to a pH of seven with a calcium hydroxide slurry and mixed for 20 minutes. The reaction mixture at 90° C. was centrifuged for ten minutes at 5000 rpm to remove insoluble impurities and recover an aqueous solution of a modified lignosulfonate composition.

EXAMPLE 6

An amount of 17.6 grams of manganese sulfate monohydrate was added to 33.2 grams an aqueous solution containing of 49.2 wt. % unneutralized fermented calcium lignosulfonate maintained at a temperature of 90° C. The calcium lignosulfonate and manganese sulfate monohydrate reacted (were mixed) for ten minutes. After adding the metal salt, the solution had a pH of 3.45. The material then was neutralized to a pH of seven with a calcium hydroxide slurry and mixed for 17 minutes. The reaction mixture at 90° C. was centrifuged for ten minutes at 5000 rpm to remove insoluble impurities and recover an aqueous solution of a modified lignosulfonate composition.

EXAMPLE 7

An amount of 54.7 grams of aluminum sulfate hydrate (natural alunogenite) was added to 257.0 grams of an aqueous solution containing 49.2 wt. % unneutralized fermented calcium lignosulfonate maintained at a temperature of 90° C. The calcium lignosulfonate and aluminum sulfate reacted (were mixed) for ten minutes. After adding the metal salt, the pH of the solution was 0.55. The material then was neutralized to a pH of seven with a calcium hydroxide slurry and mixed for 24 minutes. The reaction mixture at 90° C. was centrifuged for ten minutes at 5000 rpm to remove insoluble impurities and recover an aqueous solution of a modified lignosulfonate composition.

EXAMPLE 8

An amount of 25.2 grams of ferrous sulfate heptahydrate was added to 303.9 grams of an aqueous solution containing 47.6 wt. % fermented ammonium lignosulfonate maintained at a temperature of 90° C. The ammonium lignosulfonate and ferrous sulfate heptahydrate reacted (were mixed) for ten minutes. After adding the metal salt, the pH of the solution was 3.65. The material then was neutralized to a pH of seven with a calcium hydroxide slurry and mixed for 20 minutes. The reaction mixture at 90° was centrifuged for ten minutes at 5000 rpm to remove insoluble impurities and recover an aqueous solution of a modified lignosulfonate composition.

EXAMPLE 9

An amount of 24.0 grams of ferrous sulfate heptahydrate was added to 318.0 grams of an aqueous solution containing 43.32 wt. % fermented magnesium lignosulfonate maintained at a temperature of 90° C. The magnesium lignosulfonate and ferrous sulfate heptahydrate reacted (were mixed) for 13 minutes. After adding the metal salt, the pH of the solution was 4.15. The material then was neutralized to a pH of seven with a calcium hydroxide slurry and mixed for 20 minutes. The reaction mixture at 90° C. was centrifuged for ten minutes at 5000 rpm to remove insoluble impurities and recover an aqueous solution of a modified lignosulfonate composition.

EXAMPLE 10

An amount of 22.2 grams ferrous sulfate heptahydrate was added to 255.1 grams of an aqueous solution containing 49.9 wt. % unneutralized fermented sodium lignosulfonate maintained at a temperature of 90° C. The sodium lignosulfonate and ferrous sulfate heptahydrate reacted (were mixed) for 12 minutes. After adding the metal salt, the Ph of the solution was 3.65. The material then was neutralized to a pH of seven with a calcium hydroxide slurry and mixed for 16 minutes. The reaction mixture at 90° C. was centrifuged for ten minutes at 5000 rpm to remove insoluble impurities and recover an aqueous solution of a modified lignosulfonate composition.

EXAMPLE 11

An amount of 21.0 grams of ferrous sulfate heptahydrate was added to 307.5 grams of an aqueous solution containing 39.2 wt. % LIGNOSITE ® AC, alkaline air oxidized calcium lignosulfonate, maintained at a temperature of 90° C. The alkaline air oxidized calcium lignosulfonate and ferrous sulfate heptahydrate reacted (were mixed) for 10 minutes. After adding the metal salt, the solution had a pH of 5.2. The material was neutralized to a pH of seven with a calcium hydroxide slurry and mixed for 20 minutes. The reaction mixture at 90° C. was centrifuged for ten minutes at 5000 rpm to remove insoluble impurities and recover an aqueous solution of a modified lignosulfonate composition.

EXAMPLE 12

An amount of 23.8 grams of ferrous sulfate heptahydrate was added to 331.3 grams of an aqueous solution containing 40.7 wt. % of a sulfonated Kraft lignin (POLYFON ® T available from Westvaco, Inc.) at 90° C. The sulfonated Kraft lignin and ferrous sulfate heptahydrate reacted (were mixed) for 11 minutes. After adding the metal salt, the solution had a pH of 5.15. The material then was neutralized to a pH of seven with a calcium hydroxide slurry and mixed for 20 minutes. The reaction mixture at 90° C. was centrifuged for ten minutes at 5000 rpm to remove insoluble impurities and recover an aqueous solution of a modified lignosulfonate composition.

EXAMPLE 13

An amount of 20.5 grams of ferrous sulfate heptahydrate was added to 238.9 grams of an aqueous solution containing 49.2 wt. % unneutralized fermented calcium lignosulfonate maintained at a temperature of 90° C. The calcium lignosulfonate and ferrous sulfate heptahydrate reacted (were mixed) for 12 minutes. After adding the metal salt, the solution had a pH of 3.85. The material then was neutralized to a pH of seven with potassium hydroxide solution and mixed for 21 minutes. The reaction mixture at 90° C. was centrifuged for ten minutes at 5000 rpm to remove insoluble impurities and recover an aqueous solution of a modified lignosulfonate composition.

EXAMPLE 14

An amount of 30.8 grams of ferrous sulfate heptahydrate was added to 381.8 grams of an aqueous solution containing 46.3 wt. % unneutralized fermented potassium lignosulfonate maintained at a temperature of 90° C. The potassium lignosulfonate and ferrous sulfate heptahydrate reacted (were mixed) for 13 minutes. After adding the metal salt, the solution had a pH of 3.75. The material then was neutralized to a pH of seven with a calcium hydroxide slurry and mixed for 21 minutes. The reaction mixture at 90° C. was centrifuged for ten minutes at 5000 rpm to remove insoluble impurities and recover an aqueous solution of a modified lignosulfonate composition.

EXAMPLE 15

An amount of 23.4 grams of ferrous sulfate heptahydrate was added to 273.4 grams of an aqueous solution containing 49.2 wt. % unneutralized fermented calcium lignosulfonate maintained at a temperature of 90° C. The calcium lignosulfonate and ferrous sulfate heptahydrate reacted (were mixed) for ten minutes. After adding the metal salt, the solution had a pH of 3.65. The material then was neutralized to a pH of seven with a magnesium hydroxide solution and mixed for 39 minutes. The reaction mixture at 90° C. was centrifuged for ten minutes at 5000 rpm to remove insoluble impurities and recover an aqueous solution of a modified lignosulfonate composition.

EXAMPLE 16

An amount of 21.8 grams ferrous sulfate heptahydrate was added to 254.2 grams of an aqueous solution containing 49.2 wt. % unneutralized fermented calcium lignosulfonate maintained at a temperature of 90° C. The calcium lignosulfonate and ferrous sulfate heptahydrate reacted (were mixed) for ten minutes. After adding the metal salt, the solution had a pH of 3.9. The material then was neutralized to a pH of seven with an ammonium hydroxide solution and mixed for 19 minutes. The reaction mixture at 90° C. was centrifuged for ten minutes at 5000 rpm to remove insoluble impurities and recover an aqueous solution of a modified lignosulfonate composition.

EXAMPLE 17

An amount of 19.9 grams of ferrous sulfate heptahydrate was added to 232.1 grams of an aqueous solution containing 49.2 wt. % unneutralized fermented calcium lignosulfonate maintained at a temperature of 90° C. The calcium lignosulfonate and ferrous sulfate heptahydrate reacted (were mixed) for 11 minutes. After adding the metal salt, the solution had a pH of 3.1. The material then was neutralized to a pH of seven with a sodium hydroxide solution and mixed for 18 minutes. The reaction mixture at 90° C. was centrifuged for ten minutes at 5000 rpm to remove insoluble impurities and recover an aqueous solution of a modified lignosulfonate composition.

EXAMPLE 18

A 245.6 gram sample of a 40.0 wt. % neutralized iron lignosulfonate product generated according to the procedure of Example 1 was treated with 15 wt. % sodium hydroxide to a pH of 8.8. Thereafter, the alkaline solution was oxidized using 9 grams of 30-35 wt. % hydrogen peroxide for 24 hours with stirring at 25° C., yield the lignosulfonate composition.

PERFORMANCE TESTS

Disperant Ability

The dispersing abilities of the lignosulfonate compositions of Examples 1-18 and an unneutralized fermented spent sulfite liquor control (LIGNOSITE ® CX) were measured utilizing a water reduction test in which the amount of water required to produce a stucco slurry of a specific viscosity was determined. In all of the dispersion tests, 200 grams of a commercially available stucco material was utilized. This stucco material consisted mainly of calcium sulfate hemihydrate, but also included small amounts of anhydrous calcium sulfate, calcium sulfate dihydrate, clays, carbonates, and various soluble salts.

In each test, a stucco slurry was produced by adding to 200 grams of stucco a mixture (solution) of water, 0.02 grams sodium citrate, and 0.4 grams of the lignosulfonate dispersant solids. The sodium citrate functioned in these tests as a set retardant to prevent the slurry from hardening before the test patty could be made. The water mixture was added to the stucco, allowed to soak for 60 seconds, and then stirred for 60 seconds.

The slurry then was poured into a brass cylinder having a 1.615 inch internal diameter and a height of 4.5 inches. The bottom of the cylinder was flat (closed) except for a centrally located 0.25 inch diameter orifice. For the tests, the cylinder was positioned two inches above a glass plate to form the stucco test patty. Slurry test samples were placed in the cylinder and the slurry was allowed to flow through the orifice onto a glass plate to form a stucco patty. The amount of water required to make a 6-inch test patty under this configuration with the lignosulfonate dispersant in the mixture was compared to the amount of water required to make a 6-inch test patty under the identical configuration without the lignosulfonate in the mixture (i.e., with water and sodium citrate alone). This difference in water is reported as percent water reduction. Higher water reduction percentages are indicative of improved dispersing ability.

Set Retardation

The test for assessing set retardation of a lignosulfonate composition involved a measurement of the time required for the stucco slurry containing the lignosulfonate to harden as determined by following the rise in temperature of the setting slurry as a result of the heat of hydration.

According to the procedure, one hundred grams of the commercial stucco material identified above was utilized. This stucco material was added to a water mixture containing 0.2 gram of potassium sulfate, 0.2 gram of land plaster (finely ground calcium sulfate dihydrate), and 0.4 gram of the lignosulfonate dispersant. The land plaster and potassium sulfate are commonly added set accelerators for the commercial stucco. The amount of water used in each test was equal to 50% of the amount of water required, with each respective dispersant, to produce a 6-inch patty with 200 grams of stucco as determined above in the water reduction test used to measure dispersant ability.

After addition of the water to the stucco, the slurry was allowed to soak for 30 seconds and then stirred in a paper cup (having a volume of about 150 ml) for 30 seconds. Then a thermocouple was placed in the center of the mixture, and the temperature rise versus time was recorded until the temperature began to fall. The set time was recorded as the amount of time required for the measured temperature to achieve 95% of the total measured rise between the starting temperature and the maximum temperature.

The results of the dispersant and set retardation performance tests are tabulated in Table 1 and show lignosulfonate materials with improved dispersing characteristics which are non-set retarding in the manufacture of gypsum wallboard. This was accomplished through the addition of certain metal salts to the aqueous lignosulfonate solutions followed by neutralization using calcium, sodium, potassium or ammonium hydroxide.

When sulfonated Kraft lignin was utilized, the resulting product had improved dispersing and set retarding characteristics over lignosulfonates. This material, however, is less set retarding even before the addition of the metal salts. The samples prepared in which the lignosulfonates were alkaline oxidized before or after the addition of the metal salts had much improved dispersing ability but were more set retarding than material produced without oxidation.

From the prior art it is known that a simple base exchange of a lignosulfonate with certain metals will produce a product with slightly improved dispersing ability. However, such modified lignosulfonates exhibit undesired set retarding characteristics. Adding one of these metals to a previously alkaline treated lignosulfonate produces a material exhibiting only slightly improved dispersing and set retarding characteristics relative to the base exchanged composition, but only if the solution is held at a pH of 7 or above and at an elevated temperature for an extended period of time. Nonetheless, even under those conditions the improvements observed in dispersing and set retarding characteristics tend to be only about one half as much as is obtained in the present invention.

TABLE I

Experimental Results

| Lignosulfonate of Example Number | Water Reduction (%) | Set Time (Minutes) | Metal Cation |
|---|---|---|---|
| 1 | 8.2 | 9.56 | $Fe^{+2}$ |
| 2 | 8.3 | 9.16 | $Co^{+2}$ |
| 3 | 6.5 | 10.45 | $Cu^{+2}$ |
| 4 | 7.8 | 10.53 | $Zn^{+2}$ |
| 5 | 9.4 | 9.40 | $Fe^{+3}$ |
| 6 | 7.4 | 9.94 | $Mn^{+2}$ |
| 7 | 6.1 | 9.44 | $Al^{+3}$ |
| 8 | 9.6 | 9.16 | $Fe^{+2}$ |
| 9 | 7.2 | 9.64 | $Fe^{+2}$ |
| 10 | 8.9 | 9.69 | $Fe^{+2}$ |
| 11 | 10.4 | 10.46 | $Fe^{+2}$ |
| 12 | 8.9 | 8.80 | $Fe^{+2}$ |
| 13 | 8.6 | 9.23 | $Fe^{+2}$ |
| 14 | 7.2 | 9.22 | $Fe^{+2}$ |
| 15 | 7.5 | 9.84 | $Fe^{+2}$ |
| 16 | 9.0 | 9.46 | $Fe^{+2}$ |
| 17 | 8.4 | 9.21 | $Fe^{+2}$ |
| 18 | 10.0 | 10.09 | $Fe^{+2}$ |
| Control | 6.6 | 11.21 | — |

[1] Lignosite CX.

While certain specific embodiments of the invention have been described with particularity herein, it will be recognized that various modifications thereof will occur to those skilled in the art and it is to be understood that such modifications and variations are to be included within the purview of the application and within the spirit and scope of the appended claims.

We claim:

1. A lowered set-retarding lignosulfonate dispersing agent useful for making an aqueous calcined gypsum slurry, said dispersing agent produced by contacting an aqueous solution of a substantially non-oxidized lignosulfonate with a salt of a multivalent metal selected from the group of iron(II), iron(III), manganese(II) and cobalt(II) to form an aqueous solution of said multivalent metal salt and lignosulfonate having an acidic pH, and thereafter neutralizing said aqueous solution of said multivalent salt and lignosulfonate at an elevated temperature with an alkaline material, wherein oxidation of said lignosulfonate is avoided during said contacting and neutralizing.

2. The dispersing agent of claim 1 wherein said aqueous solution of a lignosulfonate is an unneutralized fermented spent sulfite liquor.

3. The dispersing agent of claim 2 wherein said spent sulfite liquor has a solids content of between about 30 and 60 weight percent.

4. The dispersing agent of claim 3 wherein said acidic pH is below about 6.5.

5. The dispersing agent of claim 4 wherein said acidic pH is below about 4.0.

6. The dispersing agent of claim 5 wherein said aqueous solution of said multivalent salt and lignosulfonate is neutralized to a pH of between about 6.8 and 7.2.

7. The dispersing agent of claim 1 wherein said salt of a multivalent metal is selected from the group consisting of ferric sulfate, ferrous sulfate, manganese sulfate and cobalt sulfate.

8. The dispersing agent of claim 1 wherein said aqueous lignosulfonate solution is contacted with said multivalent metal salt in an amount to supply between about 1 and 10 weight percent metal cation based on lignosulfonate solids in said solution.

9. A lowered set-retarding lignosulfonate dispersing agent useful for making an aqueous calcined gypsum slurry produced by neutralizing, at an elevated temperature, an aqueous acidic solution of a substantially non-oxidized lignosulfonate and a salt of a multivalent metal selected from the group consisting of iron(II), iron(III), manganese(II) and cobalt(II).

10. The dispersing agent of claim 9 wherein said aqueous acidic solution of a substantially non-oxidized lignosulfonate is an unneutralized fermented spent sulfite liquor.

11. The dispersing agent of claim 10 wherein said spent sulfite liquor has a solids content of between about 30 and 60 weight percent.

12. The dispersing agent of claim 11 wherein said acidic solution has a pH below about 6.5.

13. The dispersing agent of claim 12 wherein said acidic solution has a pH below about 4.0.

14. The dispersing agent of claim 13 wherein said aqueous acidic solution is neutralized to a pH of between about 6.8 and 7.2.

15. The dispersing agent of claim 9 wherein said salt of a multivalent metal is selected from the group consisting of ferric sulfate, ferrous sulfate, manganese sulfate and cobalt sulfate.

16. The dispersing agent of claim 9 wherein said aqueous acidic solution of a substantially non-oxidized lignosulfonate is contacted with said multivalent metal salt in an amount to supply between about 1 and 10 weight percent metal cation based on lignosulfonate solids in said solution.

17. The dispersing agent of claim 9 wherein said aqueous acidic solution is neutralized to a pH of between about 6.8 and 7.2.

* * * * *